United States Patent [19]

Sheldon

[11] 4,028,806
[45] June 14, 1977

[54] LAYERING KNIFE ASSEMBLY

[76] Inventor: Allen Sheldon, 1818 S. Barry Ave., Apt. No. 111, Los Angeles, Calif. 90025

[22] Filed: Feb. 20, 1976

[21] Appl. No.: 659,928

[52] U.S. Cl. .............................. 30/290; 30/296 R
[51] Int. Cl.² ...................................... B26B 29/00
[58] Field of Search .................. 30/296 R, 290, 273

[56] References Cited
UNITED STATES PATENTS

| 861,124 | 7/1907 | Keeler | 30/289 X |
|---|---|---|---|
| 1,088,955 | 3/1914 | Young | 30/273 |
| 2,134,839 | 11/1938 | Perkins | 30/287 |
| 2,212,430 | 8/1940 | Zimmerman | 30/290 UX |
| 2,779,099 | 1/1957 | Barone | 30/296 X |
| 3,038,255 | 6/1962 | Zabransky | 145/31 R |

*Primary Examiner*—Gary L. Smith
*Assistant Examiner*—J. T. Zatarga
*Attorney, Agent, or Firm*—Blakely, Sokoloff, Taylor & Zafman

[57] ABSTRACT

A layering knife assembly for cutting of layers in cakes and other pastry items and for slicing articles such as fruit. The layering knife assembly is comprised of a base member having a pair of upward projecting cylindrical members. The knife comprises an elongate blade with a handle having a pair of cooperatively disposed holes for sliding over the cylindrical members on the base so as to allow the parallel translation of the knife and blade with respect to the surface on which the base is resting. Thumb screws in the handle provide locks for retaining the knife at any desired elevation. Alternative embodiments are described.

5 Claims, 5 Drawing Figures

LAYERING KNIFE ASSEMBLY

BACKGROUND OF THE INVENTION

1. Field of the Invention

The present invention relates to the field of knives and more particularly to knives intended for use in practicing the culinary arts.

2. Prior Art

The present invention is primarily intended for use in thin slicing of objects, and more particularly for such purposes as slicing baked items for producing layers in pastry or layered cakes. Accordingly, since the primary purpose of the present invention is in slicing or layering of baked goods, the prior art relating thereto shall be described herein, it being recognized that the present invention may also be used for slicing fruit and the like in an accurate and controllable manner.

There are a number of methods which have been used for producing layers in pastry or cakes. One common method is to bake the individual layers separately for later assembly into the desired layered cake. Another method is to hand slice the cake, either by freehand (without guides) or by first inserting toothpicks around the circumference of the cake at a measured height and cutting the cake using the toothpicks as guides. String and thread have also been used, using toothpicks as guides, to form a loop large enough to encircle the cake so that the pulling of the string or thread ends tightens and constricts the loop so as to slice the cake therebetween. Finally, cake cutters are also known which drag a metal ribbon, thread or wire through a cake at specific heights.

Each of the foregoing methods of slicing layers has its own disadvantages. By way of example, baking separate layers and then assemblying the layers into cakes is inefficient, requiring several baking entities, more oven capacity, more baking pans, more cleanup, etc. Also the number of layers which may be individually baked is limited by the minimum thickness that can be baked properly, normally limiting a cake to two or three layers. While separately baked layers might be further divided, normally they cannot be divided or sliced into layers having a thickness of less than approximately one inch. Also, dividing separately baked layers further, or layering a cake by use of toothpick guides and string or thread, is difficult for the unskilled baker, and is time consuming even for the professional. Similarly, knife cutting with or without the use of toothpick guides is difficult even for the professional baker, if uniform and flat layers are to be produced. Typically, in all of these cases, the thickness of the layers is generally limited to something in excess of one inch.

Some of the problems of guides and uniformity of results are significantly alleviated by the cake cutters that drag a metal ribbon, thread or wire through a cake. However, these cuttes suffer in that they typically cannot cut in smaller increments than one inch, and typically are limited to specific increments so that they are not universally or infinitely adjustable. Further, such cake cutters, along with the hereinbefore techniques of string and thread loop cutting, cannot properly cut cakes that have baked-in ingredients such as nuts or other hard substances.

One prior art cake layer cutter is shown in U.S. Pat. No. 2,964,844. This cutter uses a wire stretched over a frame, with a plurality of grooves allowing discrete thickness adjustment for the layers to be cut thereby. Accordingly, this type of cutter is similar to that hereinbefore described in that the layer thicknesses achievable are predetermined, and since a wire is used as the cutting or separating element, baked in ingredients such as nuts and the like will not be satisfactorily cut by such a cutter. Also, in example of a metal ribbon slicer is shown in U.S. Pat. No. 2,238,186. The particular slicer shown being intended for use in slicing cheese or butter and in general having a single predetermined sliced thickness. Still another means for slicing layers of baked goods is shown in U.S. Pat. No. 3,388,469. This device utilizes a nylon thread or similar material maintained under tension by a pair of coil springs coupled to each end thereon. The slicing means is intended for slicing a cake into layers as the cake rests in the baking pan, the device having a gauging means for selecting the layer thickness for each cut using the top of the baking pan as a reference. The coil springs maintain the thread in tension, with the mechanism supporting each end of the thread being independent so that the cutting regions of the thread is extensible from substantially zero length to the full diameter of the pan. Finally, U.S. Pat. No. 3,038,255 discloses a lead bend saw intended for slicing lead bends at the required distance from the floor. The blade used is in the form of a saw which is fastened to a frame having wheels or bearings thereunder for rolling on the floor. One embodiment utilizes adjustable height rollers so tht the elevation of the saw-blade may be adjusted if desired. The device is intended for the specific purpose of cutting lead closet bends, and is specifically adapted for that purpose.

BRIEF DESCRIPTION OF THE DRAWINGS

FIG. 5 is a side view of the layering knife of FIG. 1 illustrating its use in slicing articles other than cakes, such as by way of example, fruits and the like.

DETAILED DESCRIPTION OF THE INVENTION

Figure 1:
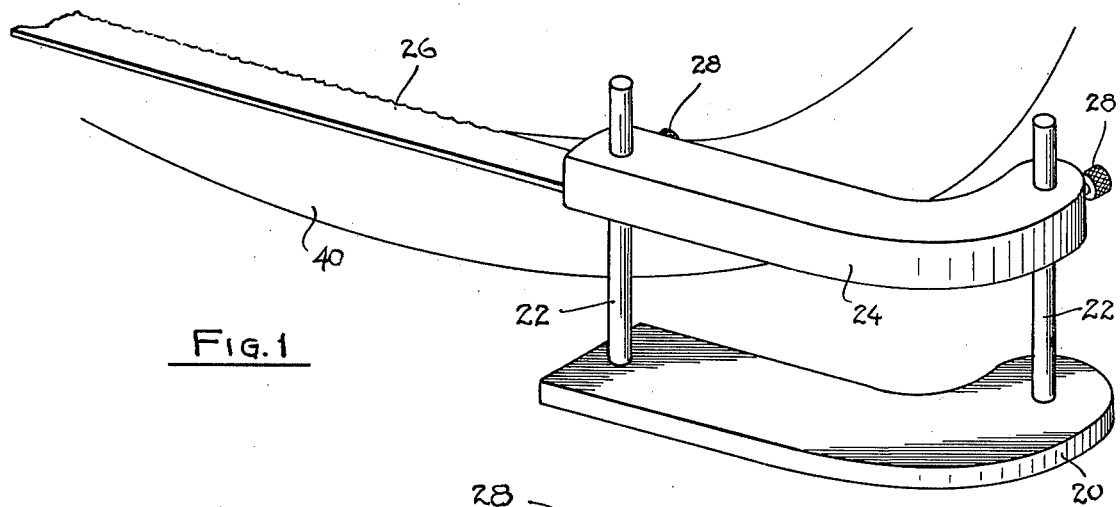
FIG. 1 is a perspective view of the present invention.

First referring to FIG. 1, a perspective view of one embodiment of the present invention may be seen. In the broadest sense the invention is comprised of a base assembly and a knife assembly. The base assembly is intended for resting on a flat work surface and for sliding thereover upon encouragement by a user. The base assembly further has at least one upward projecting member which, together with a mating surface on the knife assembly, will provide a slide means. The knife assembly is preferably comprised of a relatively long flat knife blade having a handle thereon and having, in conjunction with the handle, means for providing a sliding engagement with the upward projecting slide means on the base assembly so that the knife blade will be supported in a position substantially parallel to the supporting work surface, and may undergo parallel translation with respect thereto so as to be adjustable to different elevations with respect to the work surface. Preferably locking means are provided so that the knife handle and thus the knife blade may be locked at any specific elevation with respect to the work surface. Accordingly, a user may readily grasp the handle on the knife and slide the entire assembly back and forth over a work surface, resulting in a horizontal cutting motion of the knife blade so as to allow the accurate slicing or layering of cakes or slicing of other objects as desired, all of which may be supported in any suitable manner depending upon the object. Thus, as shown in FIG. 1, a base member 20 resting on a work surface supports a pair of upward projecting posts 22 which fit through cooperatively disposed through holes in the handle 24 of the knife assembly. The knife assembly in turn is comprised of the handle 24 together with the cutting blade 26 which, in the preferred embodiment, is a corrugated blade of the type commonly used for slicing of baked goods such as breads, cakes and the like. There is also provided a pair of thumb screws 28, barely visible in FIG. 1, which are threaded into the handle 24 in the region of the holes for posts 22 so that upon tightening of the thumb screws the handle is locked at the respective orientation, that is, with the knife blade 26 at the selected elevation above the working surface.

Figures 2, 3:
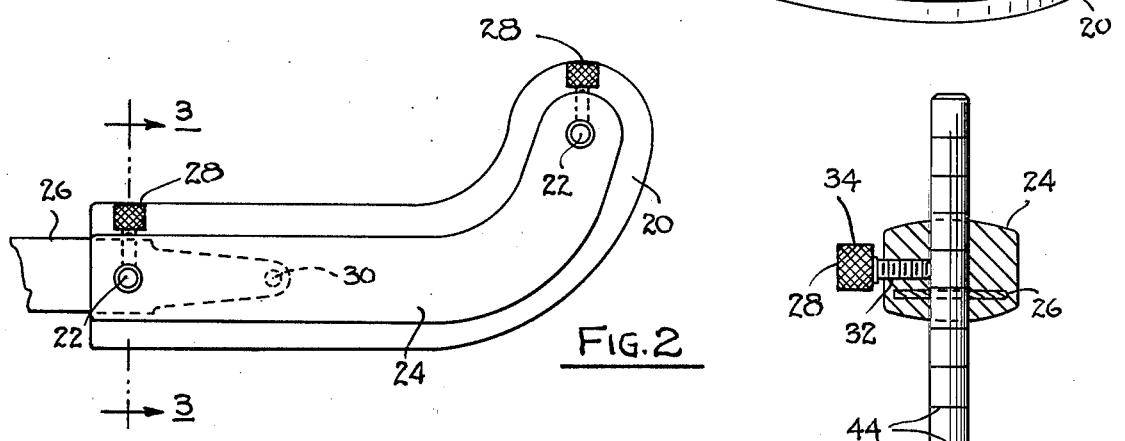
FIG. 2 is a top view of the layering knife of FIG. 1.
FIG. 3 is a partial cross section of the assembly of FIG. 2 taken along line 3—3 thereof.
Figure 4:
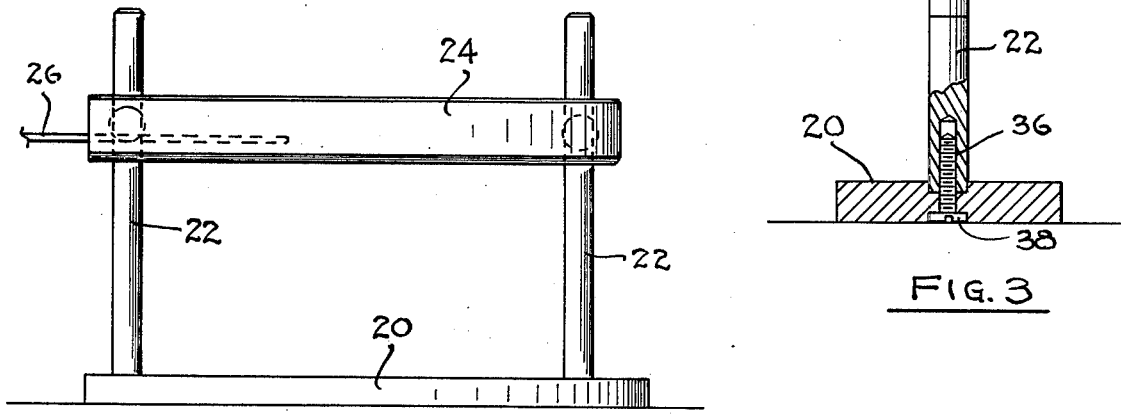
FIG. 4 is a side view of the layering knife of FIG. 1.

Now referring to FIGS. 2, 3 and 4, additional details of the construction of the preferred embodiment of the present invention may be seen. The handle 24 is preferably a one-piece handle fabricated out of metal such as aluminum or stainless steel, or molded or cut from materials such as a suitable plastic or even woods, as commonly used on knife handles. It is to be understood however that a one-piece handle is not mandatory, as two-piece handles or even handles of composite materials may be utilized. By way of specific example, a two-piece wooden handle fastened together with a pair of hollow rivets could be used, both to secure the handle pieces together and to the blade, and also to provide the cylindrical slide surfaces to mate with the upward projecting slide pins 22. Thus as shown in FIGS. 2, 3 and 4 the blade 26 is fastened to the handle within an appropriately disposed slot or opening therein, being held in place by a press fit therein. If desired, one or more pins such as pin 30 may be used to pin the blades to the handle and/or rivet a two-piece handle together. In the preferred embodiment, the blade 26 is off-set from the center plane of the handle, as may be best seen in FIGS. 3 and 4. This off-setting tends to lower the blade in conjunction with the handle, allowing slicing at lower elevations with respect to the working surface. It also allows the drilling and tapping of the handle 24 to receive the thumb screws 28, which in the preferred embodiment are characterized by a threaded shank 32, threaded through the handle so as to be engagable with the slide posts 22, and a knurled head portion 34 for easy finger tightening to lock the knife handle and thus the knife blade at the desired elevation. As previously mentioned, two locking screws 28 are used, one for each of the posts 22 to enhance the rigidity and stability of the assembly once set at the desired elevation.

Also shown in FIG. 3 is the attachment of the slide posts 22 to the base plate 20. In the preferred embodiment the base plate 20 is a simple flat plate having a profile substantially the same as the handle, though being somewhat larger in planform than the handle. The slide pins 22 are simple cylindrical pins which are cut to length and drilled and tapped at the lower end 36 thereof, with the bottom of the base plate being counterbored to receive the head of screws 38 to hold the slide pins 22 in position. It will be noted also that in the preferred embodiment the slide means, that is the pins 22 on the base assembly, are vertically directed and are round in cross-section so that simple holes in the handle assembly of the knife may provide a slip fit with respect thereto. However, it is to be understood that inclined slide means and/or slide means having cross sections other than circular may be utilized on the base assembly, with appropriately disposed mating slide means on the knife assembly achieving the same desired result, e.g., the parallel translation of the knife blade with respect to the work surface and the locking thereof at any desired elevation.

Having now described the basic structure of the preferred embodiment, some of the possible uses of the invention will be described. First with respect to FIG. 1, the lower outline 40 of a cake is shown beside the knife assembly. By merely grasping the handle 24 on the knife assembly and providing a reciprocating motion thereto, the knife blade may be caused to translate horizontally with a simple cutting motion to allow the slicing of the cake at substantially any desired elevation. The particular assembly has the advantage of providing a relatively stiff cutting member having a sharp edge, and further having the capability of substantially sawing through nuts and other baked in ingredients so as to allow the layering of a baked cake with great speed and accuracy. Furthermore while the knife blade is preferably a relatively narrow elongated blade, it should be noted that the blade need only cut to the center of the cake, as the cake may be rotated or the layering knife of the present invention may be moved fully around the periphery of the cake to complete the desired layering. Also it should be noted that while the knife blade 26 in the preferred embodiment is disposed off center with respect to the handle, and more specifically toward the lower side of the handle, the minimum elevation of the knife blade achievable with the specific structure disclosed may still be excessive for certain uses. However, in such instances the article to be sliced may readily be elevated by placing the article on an inverted pan or other utensil prior to slicing.

Figure 5:
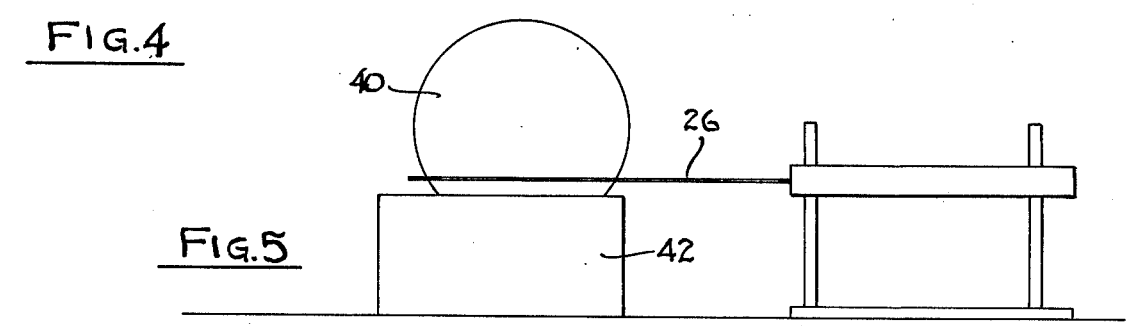

Now referring to FIG. 5, another use of the present invention may be seen. In this FIG. the slicing of an object such as an orange or lemon 40 is achieved by first elevating the object to be sliced by a block or similar article 42 and then proceeding with the slicing of the article of the present invention in the conventional manner. However, the slicing as illustrated in FIG. 5 has a particular characteristic which may be advantageous for the slicing of cakes into layers also. Specifically it will be noted that the slicing is effectively proceeding from the bottom up, that is, the slices are cut and removed from the bottom surface of the article 40 rather than the top surface. In this manner slices of uniform thickness are consistently achieved through the use of a single setting of the knife assembly. Accordingly the same method may be used with cakes whereby the layers are effectively sliced from the bottom of the cake so that the successive slicing of layers does not require readjustment of the knife blade elevation.

In the preferred embodiment of the knife edge is scalloped, though knife edges of any character such as serrated, beveled, etc. may be used, and is some instances preferred as the cutting requirement dictates. Also as previously mentioned, while a one-piece handle is used in the preferred embodiment, two or more piece handles may be coupled to the knife blade and joined together by means which may include a provision for mating with the slide members on the base assembly, or in the alternative independent of the slide means on the handle. In the preferred embodiment it has been found that the knife edge is easily capable of cutting layers as thin as one quarter of an inch and thinner, thereby easily producing finely layered cakes of high quality and accuracy. Also while the preferred embodiment base assembly is a true assembly in that the slide posts 22 are separately fabricated and attached thereto, base assemblies comprising some form of molded or cast base, including upward projecting slide means integrally molded or cast therewith, may also be used. For further flexibility the handle may be provided with grooves or hand grips, and may provide for the changing of blades with removable blade securing screws. Further, if desired, the layering knife may be fabricated to cut primarily only in defined incremental positions by such means as providing score or notch marks 44 on the post to define detents for the locking screws (tapered at the inner end thereof to mate with the notches). This will assure uniform slice thickness even when slicing cakes from the top down. Thus while specific embodiments of the invention have been disclosed and described in detail herein, it will be understood by those skilled in the art that various changes in form and detail may be made therein without departing from the spirit and scope of the invention.

I claim:

1. A knife assembly for slicing baked goods, fruits, vegetables and the like comprising:

a knife having a handle portion coupled to an elongated knife blade;

a base assembly, said base assembly having a bottom surface for resting on and sliding over a substantially flat work surface, said base assembly further having base slide means comprising a pair of cylindrical posts disposed in a parallel spaced apart disposition which are generally directed upward and perpendicular with respect to said bottom surface, said handle portion of said knife having handle slide means comprising a pair of holes through said handle for providing a slip fit on said cylindrical posts, said base slide means and said handle slide means being cooperative means to allow said knife to be slideably disposed on said base assembly with said knife blade substantially parallel to said bottom surface and at more than one elevation; and means for locking said slide means and said handle slide means with respect to each other for disposing said knife blade at a selected elevation, wherein said knife assembly with said knife blade fixed at a particular elevation may be slid over work surface, thereby imparting a cutting motion to said knife blade.

2. The assembly of claim 1 wherein said locking means comprises a pair of thumb screws threadably coupled to said handle, each disposed so as to lock against a respective one of said posts.

3. A slicing device comprising:

a knife having a generally flat elongate knife blade fastened to a handle;

a base defining a bottom surface, said base further having a pair of base slide members generally directed upward and substantially perpendicular with respect to said bottom surface, said handle having a pair of openings therein for slideably engaging said base slide members, said knife being slideably disposed on said base assembly with said knife blade substantially parallel to said bottom surface at more than one elevation; and means for locking said base slide means and said handle with respect to each other to dispose said knife blade at a selected elevation, wherein said slicing device with said knife blade fixed at a particular elevation may be slid over said work surface thereby imparting a cutting motion to said knife blade.

4. The device of claim 3 wherein said openings and the cross sections of said base slide members are substantially circular.

5. The device of claim 4 wherein said locking means comprises a pair of thumb screws threadably coupled to said handle, each being disposed so as to lock against a respective one of said base slide members.

* * * * *

UNITED STATES PATENT OFFICE
CERTIFICATE OF CORRECTION

Patent No. 4,028,806            Dated June 14, 1977

Inventor(s) Allen Sheldon

It is certified that error appears in the above-identified patent and that said Letters Patent are hereby corrected as shown below:

In Column 4, line 58, delete the word "of"

In Column 4, line 60, change the word "is" to --in--

In Column 6, line 4 (Claim 1) add the word --base-- after the word "said" and before the word "slide"

Signed and Sealed this

First Day of November 1977

[SEAL]

Attest:

RUTH C. MASON  
Attesting Officer

LUTRELLE F. PARKER  
Acting Commissioner of Patents and Trademarks